United States Patent [19]

Kawata

[11] Patent Number: 4,978,214
[45] Date of Patent: Dec. 18, 1990

[54] DISPLAY APPARATUS FOR AUTOMOTIVE VEHICLE

[76] Inventor: Hiroshi Kawata, 910, Ichisawa-cho, Asahi-ku, Yokohama-shi, Kanagawa-ken, Japan

[21] Appl. No.: 119,372

[22] Filed: Nov. 12, 1987

[30] Foreign Application Priority Data

Nov. 12, 1986 [JP] Japan ................................ 61-267457

[51] Int. Cl.$^5$ .............................................. G03B 21/00
[52] U.S. Cl. ....................................................... 353/14
[58] Field of Search ..................................... 353/11–14, 353/74, 70, 75, 77, 78, 97, 98; 350/174, 283, 284; 340/705

[56] References Cited

U.S. PATENT DOCUMENTS

| | | | |
|---|---|---|---|
| 2,641,160 | 6/1953 | Mihialakis | 353/14 |
| 2,974,564 | 3/1961 | Miller | 353/97 X |
| 3,709,589 | 1/1973 | Lamb | 353/13 |
| 3,744,893 | 7/1973 | Chandler | 353/971 |
| 3,885,095 | 5/1975 | Wolfson et al. | 350/174 X |
| 3,887,273 | 6/1975 | Griffiths | 350/174 X |
| 4,114,997 | 9/1978 | Lunetta | 353/11 |

FOREIGN PATENT DOCUMENTS 417857  7/1910  France ................................. 353/97

*Primary Examiner*—Harry N. Haroian

[57] ABSTRACT

A display apparatus for an automotive vehicle for displaying a vehicular driving information, such as vehicle speed, fuel amount, engine coolant temperature and so forth, includes a light shield interpositioned between a semi-transparent projector panel, on which information containing virtual image is formed, and a transparent panel which covers a cavity formed in an instrument panel for receiving an optical image projector device. The transparent panel is so designed as to reflect lights, such as sun beam toward the light shield. With this construction, the sun beam and so forth reflected by the transparent panel can be absorbed by the light shield to maintain contrast of the virtual image formed on the projector panel satisfactorily high and thus may not affect to visibility of the displayed image.

11 Claims, 2 Drawing Sheets

DISPLAY APPARATUS FOR AUTOMOTIVE VEHICLE

BACKGROUND OF THE INVENTION

1. Field of the Invention

The present invention relates generally to a display apparatus for an automotive vehicle, in particular to a so-called 'head-up' type display apparatus which optically forms virtual image showing information, such as driving information and so forth. More specifically, the invention relates to a head-up display apparatus which can form the virtual image overlapping the front sight of a vehicular driving to avoid necessity of looking down into an vehicular instrument panel for obtaining driving information, such as vehicle speed, engine speed, fuel amount, engine temperature and so forth. 2. Description of the Background Art Japanese Patent First (unexamined) Publications (Tokkai) Showa Nos. 60-88925 and 60-88926 discloses head-up type display apparatus. The disclosed apparatus employs a semi-transparent image projecting panel arranged inside of a front windshield. Virtual image containing vehicular driving information, such as vehicle speed (speed meter), engine speed (tachometer), fuel amount (fuel gauge), engine coolant temperature (TEMP. gauge) and so forth, is projected on the image projecting panel. The image projecting panel is formed into subatantially flat plane plate.

An optical image source is provided within an instrument panel and is designed to project optical image for forming the virtual image on the image projecting panel through a transparent projector window. The transparent window is sealingly closed by a transparent panel which has upper surface lying in flash to the upper surface of the instrument panel.

In such construction, the transparent panel in the projector window tends to reflect sun beam or shine in the day light to cause drop of contrast of the virtual image formed on the image projecting panel. This degrades visibility of the displayed image.

SUMMARY OF THE INVENTION

Therefore, it is an object of the present invention to provide a head-up type display apparatus for an automotive vehicle, which may not degrade visibility even in the day light.

Another object of the invention is to provide a head-up type display apparatus which can make the sun beam reflected by a transparent projector window unnoticable to a vehicular drive.

In order to accomplish the aforementioned and other objects, a display apparatus, according to the present invention, includes a light shield interpositioned between a semi-transparent image projecting panel, on which information containing virtual image is formed, a transparent panel which covers a cavity formed in an instrument panel for receiving an optical image projector device. The transparent panel is so designed as to reflect lights, such as sun beam toward the light shield.

With this construction, the sun beam and so forth reflected by the transparent panel can be absorbed by the light shield to maintain contrast of the virtual image formed on the image projecting panel satisfactorily high and thus may not affect to visibility of the displayed image.

According to one aspect of the invention, a display apparatus for an automotive vehicle comprises a display screen, an image source to forming an optical image and to project the optical image on the display screen for forming a virtual image thereof, an image source receptacle defined in a vehicular instrument panel for receiving the image source, and a light shield member provided at a predetermined portion of the image source receptacle for absorbing light beam irradiated thereof, and a transparent cover covering the image source receptacle and allowing the optical image to pass therethrough, the transparent cover having a surface reflecting a sun beam irradiated thereon toward the light shield so as to avoid influence of sun beam for the definition of the virtual image to be displayed on the display screen.

According to another aspect of the invention, a display apparatus for an automotive vehicle comprises a display screen, an image source to forming an optical image and to project the optical image on the display screen for forming a virtual image thereof, the image source being placed within an image source receptacle defined in a vehicular instrument panel, and the image source receptacle having at least a peripheral portion colored in a dark color, a transparent cover covering the image source receptacle and allowing the optical image to pass therethrough, the transparent cover having a surface reflecting an image of the dark colored peripheral portion of the image source receptacle onto the display screen for forming dark background image thereon.

According to a further aspect of the invention, a display apparatus for an automotive vehicle comprises a vehicular instrument panel placed in the vicinity of a front windshield of the vehicle, the instrument panel defining a recess adjacent the front windshield, a display screen provided inside of the front windshield and in front of the recess of the instrument panel, the display screen being designed for forming a virtual image overlapping with a vehicular front sight, an image source to forming an optical image and to project the optical image on the display screen for forming the virtual image thereof, the image source being placed within the recess of the instrument panel, and a transparent cover covering the recess and allowing the optical image to pass therethrough, the transparent cover having a curved reflector surface for reflecting sun beam passing through the front windshield in a direction outside of a sight of a driver at a predetermined eye point so as to avoid influence of the sun beam reflected by the reflecting surface for the visibility of the virtual image to be formed on the display screen.

According to a still further aspect of the invention, a display apparatus for an automotive vehicle comprises a vehicular instrument panel placed in the vicinity of a front widshield of the vehicle, the instrument panel defining a recess adjacent the front windshield, a display screen provided inside of the front windshield and in front of the recess of the instrument panel, the display screen being designed for forming a virtual image overlapping with a vehicular front sight, an image source to forming an optical image and to project the optical image on the display screen for forming the virtual image thereof, the image source being placed within the recess of the instrument panel, a transparent cover covering the recess and allowing the optical image to pass therethrough, the transparent cover having a curved reflector surface for reflecting sun beam passing through the front windshield in a direction outside of a sight of a driver at a predetermined eye point so as to avoid influence of the sun beam reflected by the reflecting surface for the visibility of the virtual image to be formed on the display screen, and a light shield provided with the recess and forming a part of the peripheral wall of the recess, the light shield being designed to receive the sub beam reflected by the reflector surface for absorbing the irradiated sun beam thereon, the light shield being colored in a black or equivalent dark color and so associated with the transparent cover to be projected image thereof onto the display screen for forming dark background image thereon.

In the preferred application, the display apparatus is designed for displaying a vehicular driving information including a vehicle speed, remaining fuel amount and an engine or engine coolant temperature.

The display screen is formed of a semi-transparent material so as to form the virtual image overlapping with the front sight of the vehicle.

DESCRIPTION OF THE PREFERRED EMBODIMENT

Figure 1:
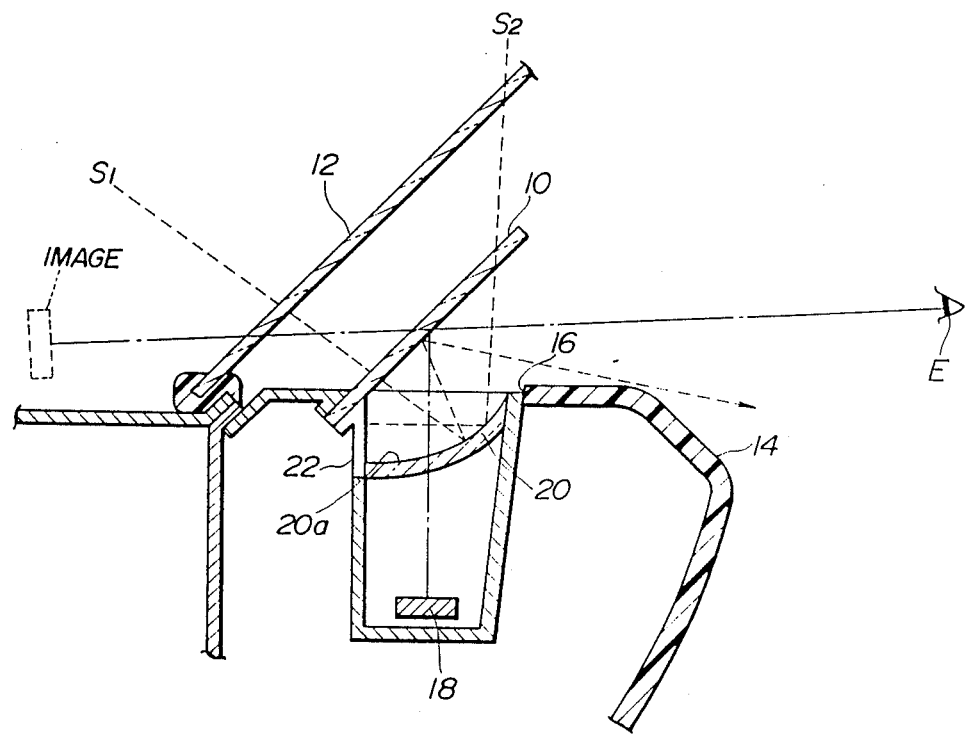
FIG. 1 is a fragmentary illustration of the preferred embodiment of a display apparatus for displaying a vehicular driving information and so forth, according to the present invention.

Referring now to the drawings, particularly to FIG. 1, the preferred embodiment of a display apparatus, according to the present invention, employs a semi-transparent plane plate for a display screen 10. Throughout the disclosure of the preferreed embodiment, this display screen will be referred to as "image projecting panel". The image projecting panel 10 is designed to be projected a virtual image containing a vehicular driving information, such as vehicle speed, engine speed, fuel amount, engine coolant temperature and so forth.

Though the following discussion will be concentrated to the display of the vehicular driving information set forth above, the display apparatus of the invention should not be limited to display of those vehicular driving information and can display other informations. For example, the display apparatus may display entertainment information, such as television program while vehicle is not running, or navigating information, such as road map and so forth. Therefore, the present invention should not be appreciated to concentrate for the vehicle driving information to be displayed.

The image projecting panel 10 is provided inside of a vehicular front windshield 12 and in the vicinity thereof. The image projecting panel 10 is inclined in axial direction at substantially corresponding inclination angle to the front windshield. The lower end of the image projecting panel 10 is secured on an instrument panel 14.

Adjacent the image projecting panel 10, the instrument panel 14 defines a cavity 16 for receiving therein a projector 18 which is fragmentarily or schematically illustrated. The projector 18 may be constructed into any known constructions which is suitable for forming optical image and for projecting the optical image onto the image projecting panel 10. The projector 18 should include a medium for forming the projecting optical image. In the simplest example, the normal indicator board with mirror-image display of normal display may be a projected image source as placed in the cavity 16. On the other hand, the projector 18 may be connected to various sensors (not shown) for receiving various vehicular driving information to be displayed. If necessary, the projector may be connected to other information source, such as television tuner, disc player which may be useful when facilitating vehicular navigation system for displaying drive guide map.

The projector 18 is so oriented to project the information containing optical image onto the image projecting panel 10 to form the virtual image on the projecting surface 10a. When the virtual image is established on the projecting surface 10a of the image projecting panel, the projected image can be seen by the driver's eye like that the image source is present outside of the front windshield 12. Therefore, the displayed information overlaps with the front sight so that driver can easily recognize the vehicular driving condition.

The cavity 16 of the instrument panel 14 is covered by a transparent cover plate 20. As seen from FIG. 1, the transparent cover plate 20 has a curved upper surface 20a. The curvature of the upper surface 20a of the transparent cover plate 20 is so selected that most incident angle of sun beam S will not be reflected toward the driver's eye E. Namely, as shown by line $S_1$, when the incident angle of the sun beam is relatively, small, the sun beam passes the semi-transparent image projecting panel to irradiate of the transparent cover as a diffused light. Then, the most light components of the incident light on the cover plate is reflected toward the image projecting panel. However, in such case, by selecting the curvature of the cover plate 20, the incident angle of the reflected sun beam on the image projecting panel is rather small to cause reflection in a direction to direct the light outside of the driver's sight. On the other hand, part of the light component of the sun beam irradiated on the cover plate 20 may be reflected in substantially in horizontal direction to be irradiated onto the front side peripheral wall of the cavity.

In order to absorb the light component irradiated onto the front side periphery of the cavity 16, a portion 22 of the front periphery is designed to serve as a light shield member. The light shield member 22 absorbs the irradiated sun beam. Therefore, the horizontally reflected light component may not influence for the visibility of the virtual image to be displayed on the image projecting panel 10.

On the other hand, when sun position is rather high and thus the incident angle of the sun beam is substantially great as shown by line $S_2$, the most light component irradiated at the upper surface 20a of the cover plate 20 is reflected toward the light shield to be absorbed.

The light shield member 22 may be colored in black and is oriented to be placed within the sight of the driver's eye at the eye point E. On the other hand, the image of the black light shield 22 is projected onto the image projecting panel 10 via the upper reflecting surface 20a of the cover plate. This image of the black light shield 22 serves to form dark background on the image projecting panel 10 provide sufficient contrast to the information containing virtual image to be displayed. Therefore, such black or dark background image of the light shield may assist for improving visibility of the virtual image to be displayed.

In the alternative embodiment, it would be possible to form the overall peripheral wall of the projector receiving cavity in the instrument panel with a light shielding material or to color the overall periphery in substantially dark cover, such as black, dark green, dark blue or other appropriate color suitable for providing dark background image for the image projecting panel and for absorbing the light beam.

In addition, the curvature of the cover plate may be selected to pass the light image from the projector 18 as a parallel light so as not to cause distortion or distraction of the image to be displayed on the image projecting panel.

With the construction set forth above, the shown embodiment will provide substantially clear and definite virtual image on the image projecting panel by avoiding influence of the sun beam.

Figure 2:
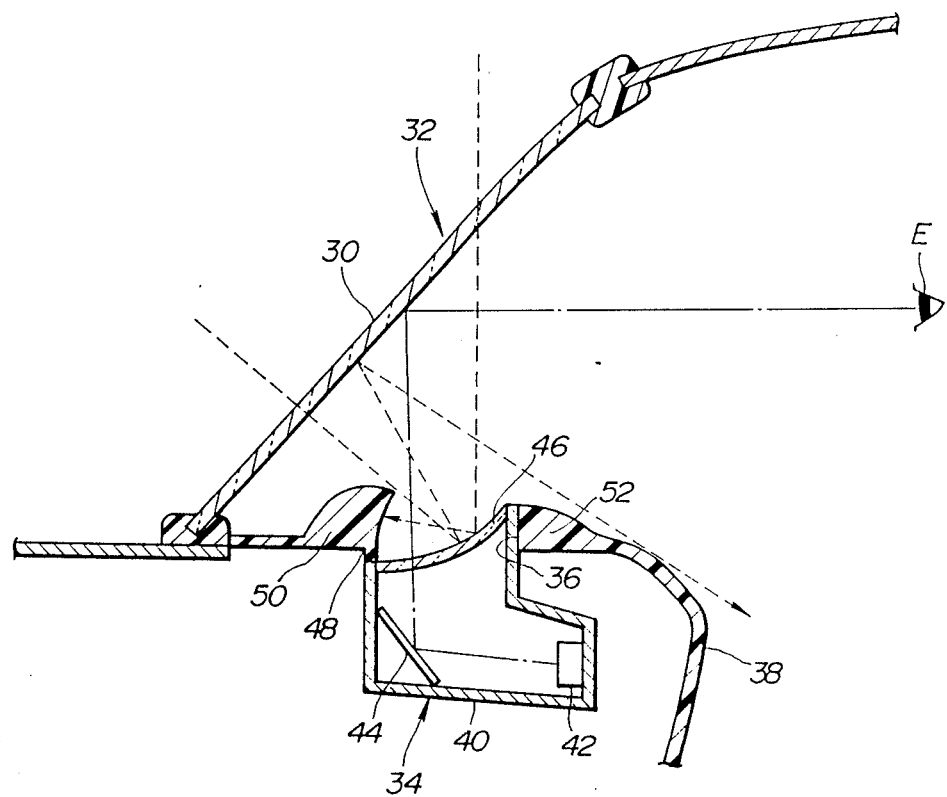
FIG. 2 is a fragmentary illustration of a modified embodiment of a display apparatus according to the invention.

Though the foregoing embodiment employs the image projecting panel separately formed, it is possible to combine or build-in the image projecting plate in the front windshield. One of the example of possible modifications of the display apparatus, according to the invention is shown in FIG. 2.

The modified embodiment is featured by an image projecting plate 30 is combined with the front windshield 32. Therefore, in the shown embodiment, the projecting plate is transparent for forming a part of the frontwindshild.

A projector unit 34 is installed within a cavity 36 in the instrument panel 38. The projector unit 34 comprises a unit housing 40 and a projector 42. In the shown embodiment, the projector 42 is arranged within the unit housing 40 to emit information containing light beam in substantially horizontal direction toward front. In order to deflect the information containing light beam, a deflector mirror 44 is provided to deflect the information containing light beam from the projector 42 toward a predetermined portion of the windshield, which serves as the image projecting plate.

So as to allow the information containing light beam to pass and to be projected on the image projecting plate 30, the top end of the unit housing 40 is made open. The open end of the unit housing 40 is closed by a transparent cover plate 46. As set out with respect to the former embodiment, the curvature of the cover plate 46 is selected so as not to reflect the sun light or so forth toward the eye point E directly for avoiding dazzlement of the driver and toward the image projecting plate 30 for avoiding fading of the projected image. In the more positive side, the curvature of the cover plate 46 is so selected as to direct the reflected sun beam to a light shielding section 48 formed on the surface of a buldged front edge 50 of the cavity 36, which light shielding section 48 opposes to the curved surface of the cover plate 46. Another buldge 52 is formed along the rear edge of the cavity 36. The rear end of the cover plate 46 is mounted on the buldge to provided proper angle of the curved surface of the cover plate.

As will be seen from FIG. 2, the front end bulged section 50 presents a sub beam component whose incident angle with respect to the curved surface is in a range to cause direct reflection toward the eye point E or foward the image projecting plate 30, from irradiating on the curved surface. This assists the light shielding effect of the light shield.

Similarly to the foregoing embodiment, since the reflected sun beam should not influence for the contrast of the projected image.

Therefore, the invention fulfills all of the objects and advantages sought therefor.

What is claimed is:

1. A display apparatus for an automotive vehicle having a vehicular instrument panel and a front windshield comprising:
    a display screen;
    an image source for forming an optical image and projecting the optical image onto said display screen for forming a virtual image thereof, said image source being disposed within an image source receptacle for projecting said image out of an opening in said receptacle;
    a light shield means disposed at a predetermined position of said image source receptacle adjacent an optical path for transmitting the optical image from said image source to said display screen, for absorbing light beams irradiated thereon; and
    a transparent cover covering said opening of said image source receptacle and allowing said optical image to pass therethrough, said transparent cover having a curved surface disposed to reflect a sun beam, the curvature of said curved surface being so selected as to provide a reflecting angle of said sun beam so that the sun beam is irradiated toward said light shield so as to avoid influence of said sun beam on the definition of the virtual image displayed on said display screen.

2. A display apparatus as set forth in claim 1, which is designed for displaying vehicular driving information including a vehicle speed, remaining fuel amount and an engine or engine coolant temperature.

3. A display apparatus as set forth in claim 1, wherein said display screen is formed of a semi-transparent material so as to form said virtual image overlapping with the front sight of the vehicle.

4. A display apparatus as set forth in claim 1, wherein said reflecting surface of said transparent cover is curved so as to concentrate the reflected sub beam onto said light shield member.

5. A display apparatus as set forth in claim 4, wherein the curvature of said reflecting surface of said transparent cover is formed into a parabolic surface.

6. A display apparatus as set forth in claim 5, wherein said light shield is colored in a black or equivalent dark color.

7. A display apparatus as set forth in claim 6, wherein said curvature of said reflecting surface of said transparent coveer is selected to reflect an image of said light shield member onto said display screen for forming dark a background for said virtual image to be established thereon.

8. A display apparatus for an automotive vehicle having a vehicular instrument panel and a front windshield comprising:
    a display screen;
    an image source for forming an optical image and projecting the optical image onto said display screen for forming a virtual image thereof, said image source being disposed within an image source receptacle for projecting said image out of an opening in said receptacle;
    a light shield means disposed at a predetermined position of said image source receptacle adjacent an optical path for transmitting the optical image from said image source to said display screen, for absorbing light beams irradiated thereon; and a transparent cover covering said opening of said image source receptacle and allowing said optical image to pass therethrough, said transparent cover having a curved surface disposed to reflect a sun beam, the curvature of said curved surface being so selected as to permit said optical image to pass therethrough and to be irradiated onto said display screen, and as to be provide a reflecting angle of said sun beam so that the sun beam is irradiated toward said light shield so as to avoid influence of said sun beam on the definition of the virtual image displayed on said display screen.

9. A display apparatus as set forth in claim 8, which is designed for displaying vehicular driving information including vehicle speed, remaining fuel amount and an engine or engine coolant terperature.

10. A display apparatus as set forth in claim 8, wherein said display screen is formed of a semi-transparent material so as to form said virtual image overlapping with the front sight of the vehicle.

11. A display apparatus for an automotive vehicle having a front windshield comprising:
 a vehicular instrument panel disposed in the vicinity of said front windshield of the vehicle, said instrument panel defining a recess adjacent said front windshield;
 a display screen provided inside of said front windshield and in front of said recess of said instrument panel, said display screen being adapted to form a virtual image overlapping with a vehicular front view;
 an image source for forming an optical image and projecting said optical image onto said display screen for forming said virtual image thereof, said image source being disposed within said recess of said instrument panel;
 a transparent cover covering said recess and allowing said optical image to pass therethrough, said transparent cover having a curved reflector surface for reflecting a sun beam passing through said front windshield in a direction out of sight of a driver to a predetermined point so as to avoid influence of the sun beam reflected by said reflecting surface on the visibility of said virtual image formed on said display screen; and
 a light shield provided within said recess and forming a part of a peripheral wall of said recess, said light shield being adapted to receive the sun beam reflected by said reflector surface for absorbing the irradiated sun beam thereon, said light shield being colored in a black or equivalent dark color and so disposed in relation to said transparent cover as to project an image thereof onto said display screen to form a dark background image thereon.

* * * * *